(12) United States Patent
Summers

(10) Patent No.: US 12,179,589 B2
(45) Date of Patent: Dec. 31, 2024

(54) SPEED CONTROLLER FOR VEHICLES

(71) Applicant: Miller Technology Incorporated, North Bay (CA)

(72) Inventor: Paul Andrew Roy Summers, North Bay (CA)

(73) Assignee: Miller Technology Incorporated, North Bay (CA)

( * ) Notice: Subject to any disclaimer, the term of this patent is extended or adjusted under 35 U.S.C. 154(b) by 0 days.

(21) Appl. No.: 18/711,904

(22) PCT Filed: Nov. 22, 2021

(86) PCT No.: PCT/CA2021/051652
§ 371 (c)(1),
(2) Date: May 21, 2024

(87) PCT Pub. No.: WO2023/087092
PCT Pub. Date: May 25, 2023

(65) Prior Publication Data
US 2024/0336133 A1    Oct. 10, 2024

(51) Int. Cl.
B60K 31/00    (2006.01)

(52) U.S. Cl.
CPC ...... *B60K 31/00* (2013.01); *B60K 2031/0091* (2013.01); *B60Y 2400/303* (2013.01)

(58) Field of Classification Search
CPC ............ B60K 31/00; B60K 2031/0091; B60Y 2400/303
See application file for complete search history.

(56) References Cited

U.S. PATENT DOCUMENTS 6,052,644 A    4/2000  Murakami et al.
7,853,388 B2   12/2010 Wang
(Continued)

FOREIGN PATENT DOCUMENTS

CA    1175932 A    10/1984
CA    2021616 A1    5/1991
(Continued)

OTHER PUBLICATIONS

English translation of Tashiro et al. (WO 2019039105 (Year: 2019).*

(Continued)

*Primary Examiner* — James M McPherson
*Assistant Examiner* — Kyle J Kingsland
(74) *Attorney, Agent, or Firm* — Joseph F. Murphy; Potomac Law Group, PLLC

(57) ABSTRACT

A system for regulating speed of a vehicle along a road surface, the system including: at least one controller; at least one throttle sensor in communication with the at least one controller; at least one brake sensor in communication with the at least one controller; at least one gear sensor in communication with the at least one controller; at least one speed sensor in communication with the at least one controller; at least one motor in communication with the at least one controller; and at least one energy source in communication with the at least one controller and the at least one motor; wherein the at least one controller further includes a proportional integral and derivative controller; and at least one retardive braking system in communication with the at least one controller and controlled by the proportional integral and derivative controller.

11 Claims, 13 Drawing Sheets

(56) References Cited

U.S. PATENT DOCUMENTS

| | | | |
|---|---|---|---|
| 10,583,838 | B2 | 3/2020 | Chang |
| 2019/0331033 | A1 | 10/2019 | Sharp |

FOREIGN PATENT DOCUMENTS

| | | | | |
|---|---|---|---|---|
| CA | 2780316 | A | 5/2011 | |
| CA | 2883421 | A1 | 8/2015 | |
| CN | 108019506 | A | 5/2018 | |
| WO | 1998016414 | | 4/1998 | |
| WO | WO-2015091051 | A1 * | 6/2015 | ............ B60T 8/1755 |
| WO | WO-2019039105 | A1 * | 2/2019 | .......... B60W 30/146 |

OTHER PUBLICATIONS

International Preliminary Report on Patentability for International Application No. PCT/CA2021/051652 dated Feb. 26, 2024.
International Search Report and Written Opinion for International Application No. PCT/CA2021/051652 dated Aug. 22, 2022.
Office Action for Australian Patent Application No. 2021474749 issued on Jul. 9, 2024.
Office Action for Chinese Patent Application No. 202180104631.6 issued on Sep. 28, 2024.

* cited by examiner

SPEED CONTROLLER FOR VEHICLES

CROSS-REFERENCE TO RELATED APPLICATIONS

This application is a 35 U.S.C. 371 national stage of International Application No. PCT/CA2021/051652, filed on Nov. 22, 2021, and the content of which is hereby incorporated by reference.

FIELD OF THE DISCLOSURE

This disclosure relates to a system and method for controlling and/or regulating the speed and/or acceleration of a vehicle, including an electric vehicle (EV), without user intervention, and in one alternative, controlling and/or regulating the speed and/or acceleration of a vehicle descending a sloped surface, and in particular a vehicle in the mining industry.

BACKGROUND

Many mining sites include extended declines (i.e., sloped road surfaces) due to the very nature of the mining industry and mining sites. Many mine vehicle operators are compensated based on the volume of wall moved or dug over time. Some mine vehicle operators may circumvent safety protocols (e.g., drive faster than regulated vehicle speed) to increase volume of wall moved or dug for greater remuneration. Vehicle operator intervention in regulating and/or controlling speed of a mining vehicle may involve: (1) intermittent brake engagement (e.g. riding the brakes) during the decline in order to control the acceleration and speed of the vehicle; (2) placing the vehicle drive gear system in a lower gear and/or neutral to avoid speed regulators; and/or (3) use of the service brakes of the vehicle to regulate speed and/or acceleration of the vehicle while traveling along a downward sloping road surface. The above vehicle operator actions not only (a) increase the risk of an accident involving the vehicle and other vehicles and operators; but also (b) increase unwanted premature wear on engine components including the braking system of the vehicle; (c) increase noise output of the vehicle; (d) increase unwanted heat generation by the vehicle; (e) increase fuel/energy consumption resulting in increased fuel/energy expenditures and emissions; and/or (f) increase wear on the engine/motor components as the vehicle and its components are in a state of high rotations/revolutions per minute (RPMs) as the vehicle is travelling downhill, resulting in increased costs in the maintenance and repair of the vehicle and related components, including the braking system.

Current solutions to regulate and/or control speed and acceleration of a vehicle rely on vehicle operator intervention and judgment to utilize the appropriate speed or gear. However, operator judgment and discretion concerning adjustment of vehicle speed and braking often results in greater brake wear, in addition to an increased likelihood of accidents resulting from user error. Another attempted solution includes retarders such as hydraulic, electric and engine compression retarders to assist in slowing vehicles down when travelling along a downward sloped surface. A hydraulic retarder works by the use of the viscous drag forces between dynamic and static vanes in a fluid-filled chamber to achieve retardation. One example of an industry hydraulic retarder is manufactured by Voith, such as, but not limited to the Voith Retarder 115 HV and the Voith Aquatarder SWR. Electrical retarders use electromagnetic induction to provide a retardation force on any of an axle, transmission, or driveline. One example of an industry electrical retarder is manufactured by Telma, such as, but not limited to a Telma electromagnetic retarder (AF 30-35). An engine compression retarder uses the engine's compression stroke to absorb energy from the vehicle's motion. The engine compression retarder uses up vehicle motion energy during the compression stroke of each piston because the other cylinders are not producing power during their power stroke time interval. Current retarders have at least the following drawbacks including the reliance of a skilled manual operator judgment to select appropriate level of retardation (i.e., trial and error) and diverts the concentration of the operator from driving the vehicle to focusing on the retardation process. The manual operator system may result in an overspeed situation wherein the operator may lose control of the vehicle potentially endangering the safety of the operator and individuals in the vicinity and potential damage to components of the vehicle as well as a "non-smooth" transition when transitioning from an overspeed situation to a desired safe speed, leading to oscillation of the speed of the vehicle and an uncomfortable driving experience given the operator is required to constantly re-adjust the vehicle speed. Prior art systems additionally add weight and components to the vehicles which adds to the inefficiency of the vehicle.

Some electric vehicles in the mining industry have systems in place based on mapping of the terrain to automatically switch gears when acceleration/deceleration is needed. However, such systems do not consider various significant factors, such as vehicle load weights or travel surface grade changes, resulting in situations wherein the vehicle is put into a lower gear which equates to high RPMs, leading to premature unwanted component wear.

There is a need for a system that automatically regulates and/or controls the speed of a vehicle traveling down a decline without the need for operator intervention. There is also a need for a speed regulating system that is always active, does not have to be turned on by the vehicle operator, and cannot be turned off by the vehicle operator when the vehicle is in operation, including being active when the vehicle is placed in neutral, thereby mitigating overspeed of the vehicle. In one alternative a password or code is required to allow the vehicle to go into Tow Mode and the vehicle can be made operational again with the input of a code. Overspeed is defined herein as a speed of a vehicle higher than a threshold value considered to be the maximum value for safe operation of said vehicle along a declined road surface with the maximum value determined by either the site, such as a mining site, location (underground or above ground) or the vehicle design/OEM testing, whichever is less. One example, in Canada, is Canadian Standards Association ("CSA") CAN/CSA-M424.3-M90 (R2020) regulation which stipulates that underground mining vehicles having a rated gross mass of 45 000 kg or less must not travel more than 32 kilometers per hour underground. There is also a need for a vehicle speed regulating and/or controlling system which does not use the service brakes, minimizing wear on and excessive heat generated from the service brakes. There is also a need for a vehicle speed regulating and/or controlling system which incorporates the use of a traction motor as a generator to provide resistance and regulate and/or control the speed and/or acceleration of the vehicle travelling along a declined road surface while reducing emissions.

SUMMARY

The following terms are used throughout:
a. current vehicle speed value=the actual speed of the vehicle while in operation;
b. current vehicle speed limit value=the current upper speed limit the vehicle may travel as set by the system of the present disclosure depending on current values as sensed by sensors of the vehicle;
c. maximum allowable vehicle speed limit value=the maximum allowable speed the vehicle may travel as set by the OEM or work/mining site; and
d. throttle is used interchangeably with accelerator.

According to an aspect of the present disclosure, there is provided a vehicle speed regulating and/or controlling system for regulating and/or controlling speed of a vehicle. In one alternative the vehicle is an electric vehicle, in another alternative an internal combustion vehicle, and yet in another alternative a hybrid vehicle, and further in yet another alternative an electric mining vehicle, traveling along a road surface.

In one alternative the vehicle is travelling along a road surface with a decline. The vehicle speed regulating and/or controlling system being active when the vehicle is on, except when the vehicle is set in "tow mode" or when the vehicle is off. The term "tow mode" is defined herein as the vehicle speed regulating and/or controlling system being deactivated, in one alternative, deactivated by means of a password protected system, while allowing the vehicle to operate at an OEM maximum speed set for 1) towing the vehicle; and/or 2) servicing, testing and/or maintenance of the vehicle. According to an aspect of the disclosure the vehicle speed regulating and/or controlling system comprises: at least one controller; at least one throttle (or accelerator) sensor in communication with the at least one controller; optionally at least one brake sensor in communication with said at least one controller; at least one vehicle speed sensor in communication with said at least one controller; and at least one retardive braking system, in one alternative a regenerative braking system, in communication with the at least one controller; wherein the at least one controller and the at least one retardive braking system regulates the vehicle speed based on comparison of current vehicle speed limit value versus current (actual) vehicle speed value. Other factors that may be incorporated to regulate the vehicle speed include but are not limited to: i) maximum allowable vehicle speed limit value; ii) gross vehicle weight; iii) maximum angle of decline of road surface; iv) radius of a static loaded tire of said vehicle; v) deceleration factor; and vi) overall gear ratio is the ratio between a motor of said electric vehicle and a wheel assembly of said vehicle. For a non-electric vehicle, the overall gear ratio is the ratio between the retarder and the drive wheels linked to the tractive device of the vehicle (as opposed to the free wheeling wheels).

In one alternative the at least one throttle (or accelerator) sensor is a throttle (or accelerator) pedal position sensor.

In one alternative, the at least one brake sensor is a brake pedal position sensor.

In one alternative, the at least one controller further comprises a proportional integral and derivative (PID) controller.

In one alternative, the vehicle speed regulating and/or controlling system further comprises at least one gear sensor in communication with the at least one controller.

In one alternative, the at least one gear sensor is a gear position sensor.

In another alternative, the at least one gear sensor is a neutral gear position sensor.

In one alternative, the at least one gear sensor is a direction range sensor or a forward, neutral and reverse (FNR) position sensor for an electric vehicle. In another alternative, the vehicle speed regulating and/or controlling system further comprises at least one tow mode indicator in communication with the at least one controller.

According to another aspect, there is provided a vehicle speed regulating and/or controlling system for regulating and/or controlling speed of a vehicle, in one alternative an electric vehicle, in another alternative an internal combustion vehicle, in yet another alternative a hybrid vehicle, and in yet another alternative an electric mining vehicle, travelling along a road surface, in one alternative travelling along a road surface with a decline. Said vehicle speed regulating and/or controlling system being active when said vehicle is in operation, except when said vehicle is in tow mode. Said vehicle speed regulating and/or controlling system comprising: at least one controller; at least one throttle (or accelerator) sensor in communication with said at least one controller; in one alternative said at least one throttle (or accelerator) sensor is a throttle (or accelerator) pedal position sensor; optionally, at least one brake sensor in communication with said at least one controller; in one alternative, said at least one brake sensor is a brake pedal position sensor; at least one vehicle speed sensor in communication with said at least one controller; wherein said at least one controller further comprises a PID controller; and at least one retardive braking system in communication with said at least one controller; wherein said PID controller and said at least one retardive braking system regulate the vehicle speed based on factors including but not limited to: i) maximum allowable vehicle speed limit value; ii) gross vehicle weight; iii) maximum angle of decline of said road surface; iv) radius of a static loaded tire of said vehicle; v) deceleration factor; and vi) overall gear ratio between a motor of said electric vehicle and a wheel assembly of said vehicle.

In one alternative, said vehicle speed regulating and/or controlling system further comprises at least one gear sensor in communication with said at least one controller.

In one alternative, said at least one gear sensor is a gear position sensor.

In another alternative, said at least one gear sensor is a neutral gear position sensor.

In one alternative, said at least one gear sensor is a forward, neutral and reverse (FNR) position sensor for an electric vehicle.

In another alternative, said vehicle speed regulating and/or controlling system further comprises at least one tow mode sensor in communication with said at least one controller;

In one alternative, said at least one throttle (or accelerator) sensor is an analog sensor, such as, but not limited to the Parker ADS50 analog sensor which is lever actuated by the position of a throttle or accelerator pedal to provide a linear output over 25 mm (1") of travel.

In one alternative, the analog sensor uses non-contact, Hall-effect technology. The Hall-effect technology incorporates a non-contact method of detecting the presence and magnitude of a magnetic field. In one alternative, the analog sensor is connected to a controller, such as, but not limited to, an electronic controller such as a Parker IQAN-MC™ master controller to receive and process the signal from the at least one throttle (or accelerator) sensor.

In one alternative, said at least one brake sensor is an analog sensor, such as, but not limited to the Parker ADS50™ analog sensor which is lever actuated by the position of a brake pedal to provide a linear output over 25 mm (1") of travel.

In one alternative, the analog sensor uses non-contact, Hall-effect technology.

In one alternative, the analog sensor is connected to a controller, such as, but not limited to, an electronic controller such as a Parker IQAN-MC™ master controller to receive and process the signal from the at least one brake sensor.

In another alternative, said at least one brake sensor is a pressure sensor to sense the pressure on a brake pad or brake line and converting the pressure to a voltage output. One example of a pressure sensor is the Parker SCP Compact Pressure Sensor.

In one alternative, the pressure sensor is connected to a controller, such as, but not limited to, an electronic controller such as a Parker IQAN-MC™ master controller to receive and process the signal from the pressure sensor.

In one alternative, said at least one speed sensor is a sensor which measures the RPM of the motor or wheel of the vehicle, one example is, but not limited to, a Parker Ground Speed (GS) 100™ which measures the RPM of the motor or wheel of the vehicle by the Hall-effect technology to translate into speed of the vehicle. The Hall-effect technology incorporates a non-contact method of detecting the presence and magnitude of a magnetic field. In this instance, detecting every time a magnet on the motor or wheel of the vehicle completes a full rotation and measuring the RPMs to determine the speed. Another alternative is a Parker True Ground Speed Sensor ("TGSS") 740™ which measures the true ground speed of a vehicle by incorporation of a Doppler shift. A microwave signal is transmitted out of the TGSS and the signal is reflected off the road surface and the reflected signal is received by the TGSS. When the road surface is moving relative to the TGSS, a change in the reflected signal (Doppler shift) frequency occurs. The true ground speed is calculated by measuring the frequency change. In one alternative, the at least one speed sensor is connected to a controller, such as, but not limited to, an electronic controller such as a Parker IQAN-MC™ master controller to receive and process the signal from the at least one speed sensor.

In one alternative, said at least one gear sensor is at least one Forward, Neutral, Reverse ("FNR") position sensor.

In one alternative, said at least one FNR position sensor is a digital sensor such as, but not limited to, the COBO Group Controller Area Network (CAN) FNR sensor. The COBO Group CAN FNR sensor works by the Hall-effect technology determining if rotation is occurring or not (i.e. neutral) and whether rotation is forward or reverse.

In one alternative, the pressure sensor is connected to a controller, such as, but not limited to, an electronic controller such as a Parker IQAN-MC™ master controller to receive and process the signal from the at least one FNR position sensor.

In one alternative, said system further comprises a grade sensor to measure the grade or slope of the terrain the vehicle is travelling. One alternative is, but not limited to, an inclinometer, such as a Signal Quest SQ-GIX™.

In one alternative, the inclinometer works together with the Parker IQAN-MC™ master controller.

In one alternative, said at least one retardive braking system comprises at least one retarder such as, but not limited to hydraulic, electric and engine compression retarders to assist in slowing vehicles down when travelling along a downward sloped surface. A hydraulic retarder works by the use of the viscous drag forces between dynamic and static vanes in a fluid-filled chamber to achieve retardation. One example of an industry hydraulic retarder is manufactured by Voith, such as, but not limited to the Voith Retarder 115 HV and the Voith Aquatarder SWR. Electrical retarders use electromagnetic induction to provide a retardation force on any of an axle, transmission, or driveline. One example of an industry electrical retarder is manufactured by Telma, such as, but not limited to a Telma electromagnetic retarder (AF 30-35). An engine compression retarder uses the engine's compression stroke to absorb energy from the vehicle's motion. The engine compression retarder uses up vehicle motion energy during the compression stroke of each piston because the other cylinders are not producing power during their power stroke time interval. In one alternative, said retardive braking system is a regenerative braking system.

According to another aspect, there is provided a method of regulating and/or controlling speed of a vehicle, comprising the steps of: a) receiving a speed signal from a speed sensor on the vehicle i) at the instant the accelerator or throttle is disengaged and/or ii) at the instant the brake pedal is disengaged; b) determining if the current speed signal received from the speed sensor on the vehicle is greater than a current vehicle speed limit value; c) if the current speed signal received from the speed sensor on the vehicle is greater than the current vehicle speed limit value, a correction value is calculated by a PID loop logic in a controller and retardive braking is initiated to adjust the speed of the vehicle so as to maintain the current speed value to the current vehicle speed limit value; d) if the current speed signal received from the speed sensor on the vehicle is less or equal to the current vehicle speed limit value, no correction value is calculated; and e) repeating the steps throughout the operation of the vehicle. In one alternative said vehicle is an electric vehicle, in another alternative said vehicle is an internal combustion vehicle, in yet another alternative said vehicle is a hybrid vehicle, in another alternative said electric vehicle is an electric mining vehicle, travelling along a road surface, in one alternative travelling along a road surface with a decline. In one alternative, said retardive braking is at least one retarder selected from the group consisting of hydraulic, electric and engine compression retarders to assist in slowing vehicles down when travelling along a downward sloped surface. A hydraulic retarder works by the use of the viscous drag forces between dynamic and static vanes in a fluid-filled chamber to achieve retardation. One example of an industry hydraulic retarder is manufactured by Voith, such as, but not limited to the Voith Retarder 115 HV and the Voith Aquatarder SWR. Electrical retarders use electromagnetic induction to provide a retardation force on any of an axle, transmission, or driveline. One example of an industry electrical retarder is manufactured by Telma, such as, but not limited to a Telma electromagnetic retarder (AF 30-35). An engine compression retarder uses the engine's compression stroke to absorb energy from the vehicle's motion. The engine compression retarder uses up vehicle motion energy during the compression stroke of each piston because the other cylinders are not producing power during their power stroke time interval.

According to another aspect, there is provided a method of regulating and/or controlling speed of a vehicle.

In one alternative said vehicle is an electric vehicle, in another alternative said vehicle is an internal combustion vehicle, in yet another alternative said vehicle is a hybrid vehicle, in another alternative said electric vehicle is an electric mining vehicle, travelling along a road surface, in one alternative travelling along a road surface with a decline, said method comprising: (except when said vehicle is in tow mode):

1. inputting into at least one controller in said vehicle:
   i) a maximum allowable vehicle speed limit value;
   ii) a gross vehicle weight;
   iii) a maximum angle of decline of said road surface;
   iv) a radius of static loaded tire of said vehicle;
   v) optionally, a deceleration factor; and
   vi) an overall gear ratio between a motor of said electric vehicle and a wheel assembly of said electric vehicle; allowing said at least one controller to calculate a maximum required retardive torque value for deceleration of said vehicle to zero speed; or
2. calculating a maximum required retardive torque value to decelerate said vehicle to zero speed and entering said value into at least one controller; wherein said maximum required retardive torque value for deceleration of said vehicle to zero speed, in one alternative, is based on TB=[rT×Wv×(Fd+sinθ)]/RG, where TB=maximum required retardive torque, rT=radius of static loaded tire, Wv=gross vehicle weight, Fd=deceleration factor, θ=maximum angle of decline of the road surface, RG=overall gear ratio between motor and wheel assembly;
3. input a maximum allowable vehicle speed limit value for said vehicle into the at least one controller as determined by site conditions and/or by design and or by OEM testing and/or government or industry regulation(s), whichever is lower; in one alternative, said maximum allowable vehicle speed limit value is chosen based on current industry legislative regulations for vehicle speeds (such as but not limited to current mining regulations for maximum vehicle speeds, or maximum vehicle speed as dictated by a working site specifications);

Concurrently:

4. determining if throttle (or accelerator) of said vehicle is engaged; in one alternative, determining if a throttle (or accelerator) pedal is engaged; in yet another alternative, determining if throttle (or accelerator) is engaged, wherein determining if throttle (or accelerator) is engaged is determined by at least one throttle (or accelerator) sensor;
5. whenever said throttle (or accelerator) of said vehicle is engaged, set vehicle speed limit value to said maximum allowable vehicle speed limit value of step 4;
6. whenever said throttle (or accelerator) of said vehicle is not engaged, said at least one controller records the current vehicle speed value at time of throttle (or accelerator) release and sets this current vehicle speed value at time of throttle (or accelerator) release as a new vehicle speed limit value;
   a, wherein steps 4-6 are continuously carried out throughout operation of said vehicle;
7. in one alternative, optionally concurrently determining whenever at least one brake of said vehicle is engaged; in one alternative determining if a brake pedal of said vehicle is engaged; in another alternative, determining if a brake pedal of said vehicle is depressed, wherein determining if at least one brake of said vehicle is engaged is determined by at least one brake sensor;
8. whenever said at least one brake of said vehicle is engaged the vehicle speed limit value of step 6 is not changed;
9. whenever said at least one brake of said vehicle is released or not engaged, the current vehicle speed value at time of release of said at least one brake of said vehicle is recorded and set as the new vehicle speed limit value; in one alternative determining the current vehicle speed value is determined by at least one speed sensor, at least one RPM sensor of at least two opposing wheels on the same axle of said vehicle and converting said RPMs into speed of the vehicle; in one alternative said current vehicle speed value is determined by a ground speed sensor, such as, but not limited to, a doppler radar; in another alternative, said current vehicle speed value is determined by a motor speed encoder by changing the RPM of said motor into a vehicle speed and combinations thereof;
   a, wherein steps 7-9 are continuously carried out throughout operation of said vehicle; and in one alternative, steps 7-9 are optional;
10. actively compare the current vehicle speed value to the current vehicle speed limit value with a PID loop logic controller;
11. whenever said current vehicle speed value is approaching or greater than said current vehicle speed limit value, said PID loop logic controller determines a correction value for vehicle speed value required to set a retardive braking value greater than zero in order to maintain current vehicle speed value equal to or below said current vehicle speed limit value;
12. if said current vehicle speed value is less than said current vehicle speed limit value, said retardive braking value is set to a value to maintain said current vehicle speed value less than or at said vehicle speed limit value;
    a, wherein steps 10-12 are continuously carried out throughout operation of said vehicle; and
    b, wherein steps 4-12 are carried out concurrently and continuously throughout operation of said vehicle;
13. optionally, upon setting a correction value required to set a retardive braking value in order to maintain current vehicle speed value equal to or below said current vehicle speed limit value, determine if vehicle drive gear (or traction drive of FNR position) is neutral;
14. if vehicle drive gear (or traction drive or FNR position) is neutral, multiply the correction value determined in step 11 by a neutral gain value; in one alternative, said neutral gain value is greater than 0 and less than or equal to 1; preferably between about 0.5 and less than or equal to 1; and in another alternative, said neutral gain value is about 0.8;
15. if vehicle drive gear (or traction drive) is not neutral, the correction value is set as the retardive brake value of step 11; wherein the retardive brake value is an additional torque value required to decelerate the vehicle speed to maintain said vehicle speed to the current vehicle speed limit value for the decline of said road surface; and
16, wherein whenever said vehicle is in tow mode, said method of regulating and/or controlling speed of a vehicle is disengaged. In one alternative, should the system determine there is a problem with the vehicle (i.e. the vehicle is unsafe to operate) the system will recommend towing of the vehicle. When a tow mode command is inputted into said system, said method of regulating and/or controlling speed of a vehicle is disabled.

In one alternative, the system described herein is activated when the vehicle's power is initiated and the system remains active while the vehicle power is on and the vehicle is operational. In this manner, a vehicle operator is not required to assess whether the vehicle is over speeding. The speed regulation system and method also does not incorporate the service brakes of the vehicle to correct for speed of the vehicle, but rather, uses the traction motor of the vehicle as a generator to provide resistance to the traction motor (discussed below) and control speed of the vehicle in response to the signal from the controller based on the comparison of the current vehicle speed value to the current vehicle speed limit value. Some benefits of the system described herein include mitigation of over speeding of vehicles and maintaining speeds of said vehicles within safe ranges, reduced repetitive joint movement of a vehicle operator, in particular the ankle joint of a vehicle operator due to reduced pedal operation, reduced muscle fatigue of the vehicle operator, and a reduction in waste heat produced by the vehicle and vehicle components, including, but not limited to, brakes and axles of the vehicle, given the reduced use of service brakes by speed control through retardive braking as well as a reduction in unwanted emissions.

According to one alternative, the speed regulating system described herein incorporates the use of PID control loop logic to determine a retardive request in order for retardive braking to assist in regulating speed of the vehicle.

PID control is known to a person of ordinary skill and has been used in industry to obtain an optimal response. A PID control algorithm is an accepted standard in industry and is herein applied to regulating speed of a vehicle, in one alternative an electric vehicle, by determining a retardive current value in order to implement retardive braking in regulating speed of a vehicle, in particular, a vehicle moving along a decline.

Retardive braking is known to a person of ordinary skill. Retardive braking is an energy recovery mechanism that slows down a moving vehicle or object by converting its kinetic energy into an alternate form of energy such as electrical or heat. In this mechanism, the electric traction motor uses the vehicle's momentum to recover energy that would otherwise be lost to the brake discs as heat. One form of retardive braking is regenerative braking known to a person of ordinary skill.

In one alternative, when the vehicle operator has reached the current vehicle speed limit value of the vehicle and releases the accelerator and/or brake pedal(s), the current vehicle speed limit value is set automatically as the current (actual) vehicle speed value by the PID controller. A further parameter may be set in that a maximum road speed for the vehicle is preset (becoming the default initial current vehicle speed limit value for the PID controller), in embodiments, by the vehicle manufacturer, governmental or policy standards/regulations, and/or by site specific maximum allowable vehicle speed limit value. In one alternative, on the condition that the system determines that the throttle (or accelerator) is engaged (such as the accelerator pedal) by the vehicle operator, while the vehicle is travelling down a decline, or the vehicle gear position or FNR position is set to neutral, both being an attempt to generate an overspeed event, the system described herein when comparing the current vehicle speed value to the current vehicle speed limit value provides a damping or regulating event to thereby prevent the vehicle from over speeding and maintaining a safe speed to travel down a decline. In one alternative, this is accomplished by calculating one or more correction values and applying a retardive braking drive command to the motor to cause the motor to perform regenerative braking of the vehicle in an amount sufficient to reduce the current vehicle speed value to a level below a threshold vehicle speed limit value corresponding to an over speeding condition.

In another alternative, if the control system of the present disclosure detects the current vehicle speed value is greater than a threshold vehicle speed limit value and further detects that the condition that the vehicle is on a decline, the PID controller, compares the current vehicle speed value (or current acceleration rate if the derivative of speed is used; or uses the integral of the current acceleration rate to arrive at the current speed) to the preset current vehicle speed limit value (or target acceleration rate) to determine an error term as an input to the PID controller algorithm, resulting in a calculated retardive braking correction value to apply to the motor in order to maintain and/or obtain a target RPM of the motor to arrive at the current vehicle speed limit value and/or maintain a current vehicle speed value less than a current vehicle speed limit value indicative of an overspeed condition. The PID algorithm calculates the retardive braking correction value from the error term or error value as follows:

$$U_T = P_x \Delta_T + |\int \Delta_T - D_x(\Delta_T - \Delta_{(T-1)})$$

wherein
$U_T$=PID control correction value variable
$P_x \Delta_T$=proportional gain
$\Delta_T$=error value
$|\int \Delta_T$=integral gain; and
$D_x (\Delta_T - \Delta_{(T-1)})$=derivative gain.

The first gain value, $P_x \Delta_T$, is the proportional gain value. The proportional gain value translates such that the larger the error term or $\Delta_T$=error value, the greater the requested deceleration will be for correcting for over speeding of the vehicle. The higher the current vehicle speed value is from the current vehicle speed limit value, the larger the error term (error value) and the greater the requested deceleration (i.e. correction value or $U_T$). The second gain value, $|\int \Delta_T$, is the integral gain value which summates the determined error terms over a period of time interval. In one alternative, the current time interval in which determined error terms are summated is every 10 milliseconds (ms). A range of time interval may be between 10 to 500 milliseconds. The third gain value, $D_x (\Delta_T - \Delta_{(T-1)})$, is the derivative gain value which examines the rate of change of the determined error term to predict future required correction such that the correction is not overshot. The three gain values are incorporated into the calculations in order to determine the required retardive braking correction, $U_T$, also known as the requested deceleration as needed.

Controlling or regulating the RPMs of the electric motor of an electric vehicle is maintained by modulating the strength of the magnetic field and the amount of current being generated by the retardive braking, in this instance a regenerative braking system. This modulation converts the unwanted (or excess) kinetic energy to electrical energy. The greater the current generated by the modulation above, the more resistance on the motor ("retardive torque") and thus the greater the deceleration on the vehicle to arrive at the desired vehicle speed value. Contrary to existing systems, retardive braking in this application is carried out during acceleration of the vehicle, whereas traditionally retardive braking is carried out during deceleration. As the target RPM, which translates to the target speed (or the current vehicle speed limit value), the current generated is reduced at a rate that the vehicle operator will sense the deceleration as a smooth process rather than a choppy process (i.e.

lurching forward and braking causing the vehicle operator to be moved forward towards the steering wheel) resulting in vehicle operator discomfort.

In this application, the regenerative curve resulting from the system and method is modulating in nature, whereas most electric vehicles have a constant regenerative curve. The modulating rate of the regenerative braking, in this application, is such that deceleration is not required unless there is unwanted acceleration as determined by the system when comparing the current vehicle speed value to the current vehicle speed limit value as discussed herein. Thus, the regenerative braking as described herein is used as a dynamic rate in order to control or regulate vehicle speed.

In this application, the system pulses in the deceleration in order to maintain a current vehicle speed limit value, whereas present cruise control pulses in acceleration mode. In other words, the present application removes kinetic energy from the system whereas the prior art adds kinetic energy to the system.

DETAILED DESCRIPTION

Figure 1:
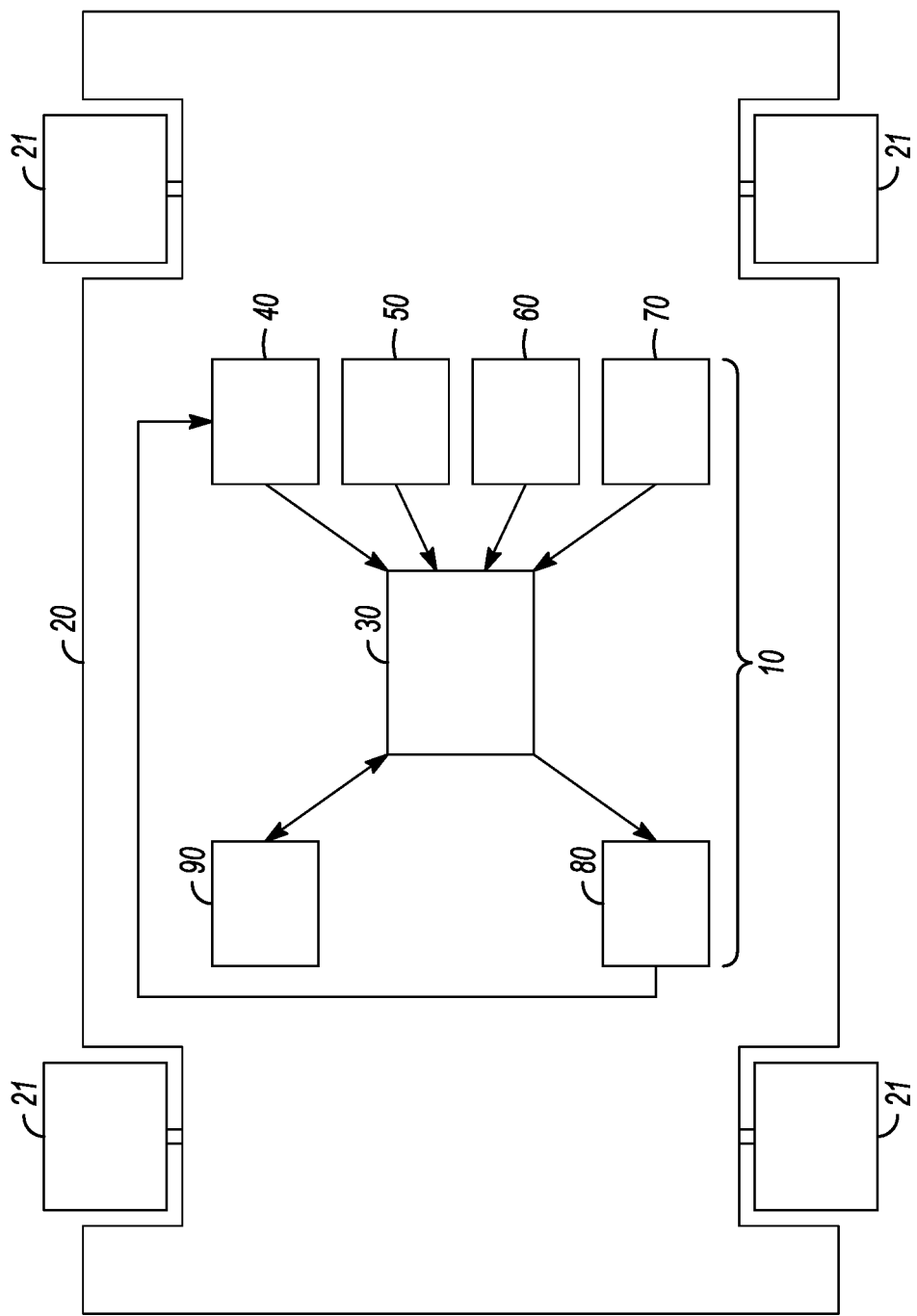
FIG. 1 is a schematic diagram of the system components, according to one alternative.

Referring now to FIG. 1, there is depicted a vehicle speed modulator 10 for a vehicle 20, and in particular an electric vehicle. The speed modulator 10 comprises a number of components, including a controller 30, that may be a PID controller, in communication with a plurality of sensors, in particular a vehicle speed sensor 40, an optional brake sensor 50, a accelerator (or throttle) sensor 60, and an optional directional range, or gear position (or FNR position) sensor 70, a vehicle motor 80 (for a non-electrical vehicle, 80 is a retardive device, such as, but not limited to, a hydraulic retarder, a Direct Current motor, or the like for non-electric vehicles), and a power source 90. Sensors 40, 50, 60 and 70 are in communication with the controller 30 sending signals from each of the sensors to the controller 30.

In particular, sensor 40, may be a digital sensor sensing rotation of the vehicle motor 80 and sending a pulse per second value to the controller 30, providing the rotations per minute of the vehicle motor 80 which is then converted to vehicle speed by the controller 30. Alternatively, sensor 40 may be "true ground speed" sensor working on the principle of a Doppler wave. Alternatively, a Global Positioning System (GPS) sensor may be used as understood by a person of ordinary skill in the art. Alternatively, the Hall-Effect may also be used as understood by a person of ordinary skill in the art. Referring now to brake sensor 50, the sensor may be an analog potentiometer, in one alternative a linear or rotational potentiometer, which measures the brake engagement, in one alternative, the relative position of the brake pedal from a non-engaged first position to an engaged second position, wherein a non-engaged first position is sensed as 0% depression and an engaged second position is sensed at greater than 0% up to 100%. Wherein at full depression, said second position is sensed at 100%. In this alternative the signal from the brake sensor to the controller is selected from a voltage value or a current value. In another alternative, said brake sensor is a force load cell, measuring the load on the brake pedal. In another alternative, said brake sensor is a brake pressure sensor measuring brake pressure by a pressure transducer sending voltage or current signal to the controller.

The accelerator (throttle) sensor 60 may be an analog potentiometer, in one alternative a linear or rotational potentiometer, which measures the accelerator engagement, in one alternative, the relative position of the accelerator pedal from a non-engaged first position to an engaged second position, wherein a non-engaged first position is sensed as 0% depression and an engaged second position is sensed at greater than 0% up to 100%. Wherein at full depression, said second position is sensed at 100%. In this alternative the signal from the accelerator sensor 60 to the controller 30 is selected from a voltage value or a current value converted by the controller to 0% non-engaged up to 100% fully engaged. In another alternative, said accelerator sensor 60 is a force load cell, measuring the force exerted on the accelerator pedal.

The optional gear position sensor (or FNR sensor) 70 is at least one switch, preferably a plurality of switches, more preferably a digital switch, sensing if switch is engaged or disengaged. Preferably said at least one switch controls the gear position from at least one of Forward, Neutral and Reverse. In one alternative, there are two switches, wherein one of said two switches engaging Forward position and the other of said two switches engaging Reverse position. Preferably there are three switches, one for Forward, one for Neutral and one for Reverse position. Said gear position sensor 70 sending a digital voltage signal to the controller sensing if Forward, Neutral or Reverse is engaged or not. Alternatively, an analog potentiometer may be used to determine the gear position of the vehicle. Alternatively, a capacitive touch sensor may be used to determine gear position and send a digital signal to the controller.

Vehicle speed sensor 40 measures the speed of the vehicle 20. In one alternative, the speed of the vehicle 20 is measured at a frequency of 10 ms. In another alternative, the frequency is 1 to 1000 ms, more preferably 1 to 500 ms. This measurement may be carried out as known to a person of ordinary skill and may include measuring the RPMs of the vehicle motor 80. The vehicle speed sensor 40 may be selected from the sensors described herein. The vehicle speed sensor 40, when it is a digital sensor or a Hall-effect type sensor, may be positioned anywhere along the power transmission path. One alternative is a vehicle speed sensor 40 at each wheel 21 on a common axle. Another alternative, said sensor may be positioned at any position of a rotating member connected to the tractive device. For a sensor using the Doppler wave, the sensor may be positioned on the vehicle 20 where there is a clear line of sight to the ground surface. For a GPS sensor, the sensor may be positioned on/in the vehicle 20 with communication to a satellite.

Brake sensor 50 measures the level of braking on the vehicle 10 from the brake. It may be measured based on brake pedal position (i.e. engaged or not) or other braking measurements known to persons of ordinary skill, including, but not limited to, measuring motor torque and/or motor amperage. Brake sensor 50 may be selected from those described herein. In one alternative, the brake sensor 50, when an analog potentiometer and/or force load cell, may be positioned on or proximate the brake pedal. When the brake is a pressure pad, brake sensor 50 is a brake pressure sensor, it may be positioned anywhere within the brake hydraulic circuit to measure the pressure on the brake pressure pad.

Accelerator (or throttle) sensor 60 measures the acceleration (or throttle position) of the vehicle 20. This measurement may involve measuring the position of the accelerator (or throttle) pedal position in a vehicle 20 or other methods known to persons of ordinary skill as described herein. Accelerator (or throttle) sensor 60 may be selected from those described herein. Accelerator sensor, when an analog potentiometer or force load cell may be positioned at or proximate the accelerator pedal.

Optional directional range or gear position or FNR position sensor 70 measures if the gear or FNR position of vehicle 20 is in forward, neutral or reverse. This measurement may involve measuring the position of the gear shift lever or other methods known to persons of ordinary skill as described herein. Directional range sensor 70 may be selected from the sensors described herein. Gear position sensor 70 may be positioned at or proximate to the tractive device sensing the direction of rotation of said tractive device, when said vehicle is an electric vehicle. Alternatively, said gear position sensor 70 may be positioned at or proximate to the transmission sensing the gear engaged, when said vehicle 20 is a non-electric vehicle.

In on alternative, vehicle motor 80 not only gives the tractive motion to the vehicle 20 but also acts as the retardive braking system. Vehicle motor 80 also acts as a generator for the retardive braking as determined by the PID in the controller 30.

Power source 90 provides power to the controller 30 and may be charged by the vehicle motor 80.

The communication between vehicle motor 80 and controller 30 is one-way (from 30 to 80), but a signal from 80 is sent to controller 30 via vehicle speed sensor 40, and communication from power source 90 and controller 30, is two-way to facilitate retardive braking as required by the PID logic in controller 30 to ensure power source 90 has capacity to store energy from 80.

Example 1

The following is an example of the system and method described herein.

The first step involves inputting values into said controller to allow for calculating the maximum designed retardive torque for safe deceleration of a vehicle from maximum speed including: i. input the maximum allowable vehicle speed limit value allowed at the site the vehicle will be implemented; ii. input the gross vehicle weight rating; iii. input the maximum design angle of decline for the vehicle (maximum steep of a decline for the vehicle); iv. input the radius of the static loaded tire (i.e. static loaded radius). The static loaded radius is the loaded radius of a stationary tire inflated to the recommended pressure. The loaded radius is the distance from the centre of the tire contact to the wheel centre measured in the wheel plane; v. input the deceleration factor, which is a value of how aggressively the vehicle speed should decrease; vi. input the overall gear ratio between the motor and the wheel assemblies (allowing for the PID logic to be used in vehicles that have a transfer case or a transmission or different axles). If there is no transmission or transfer case for an electric vehicle, use a overall gear ratio of 1:1; and vii. inputting these values into the following formula will calculate the required retardive torque in order to decelerate the vehicle depending on the angel of decline and other factor identified below:

$TB=[rT \times W_v \times (F_d + \sin\theta)]/R_G$, where TB=required retardive torque, rT=radius of static loaded tire, $W_v$=gross vehicle weight, $F_d$=deceleration factor, θ=angle of decline of the road surface, $R_G$=overall gear ratio between motor and wheel assembly.

In one instance, the TB value may be used as is and, in another instance, the required retardive torque value may be converted into a vector which may be a scaled mathematical value from a value of zero to a value of 100, depending on controller. Zero being no retardive torque on the vehicle and 100 being the calculated maximum retardive torque on the vehicle.

In a basic system, the TB calculated value is inputted manually into the vehicle speed controller. In a more advanced system, each parameter of the TB equation is inputted into the vehicle speed controller and the controller calculates the TB.

The system is always active, if the vehicle power is engaged, regardless of gear setting or position. The system is active in neutral (when the gear system is not engaged or when the FNR direction range is in neutral). As stated herein, one drawback of prior art systems is the retardive system is not engaged when the vehicle is in neutral which may result in the vehicle operator circumventing the retardive system by placing the vehicle in neutral. One benefit of having the system active in neutral is mitigating vehicle operator misuse that may put the vehicle in neutral to avoid gear limitations and try to glide down a decline and either surpass vehicle speed limited by controls and/or wear down the braking system. The only time the system is not active is when the vehicle is off and when in tow mode.

Figure 2:
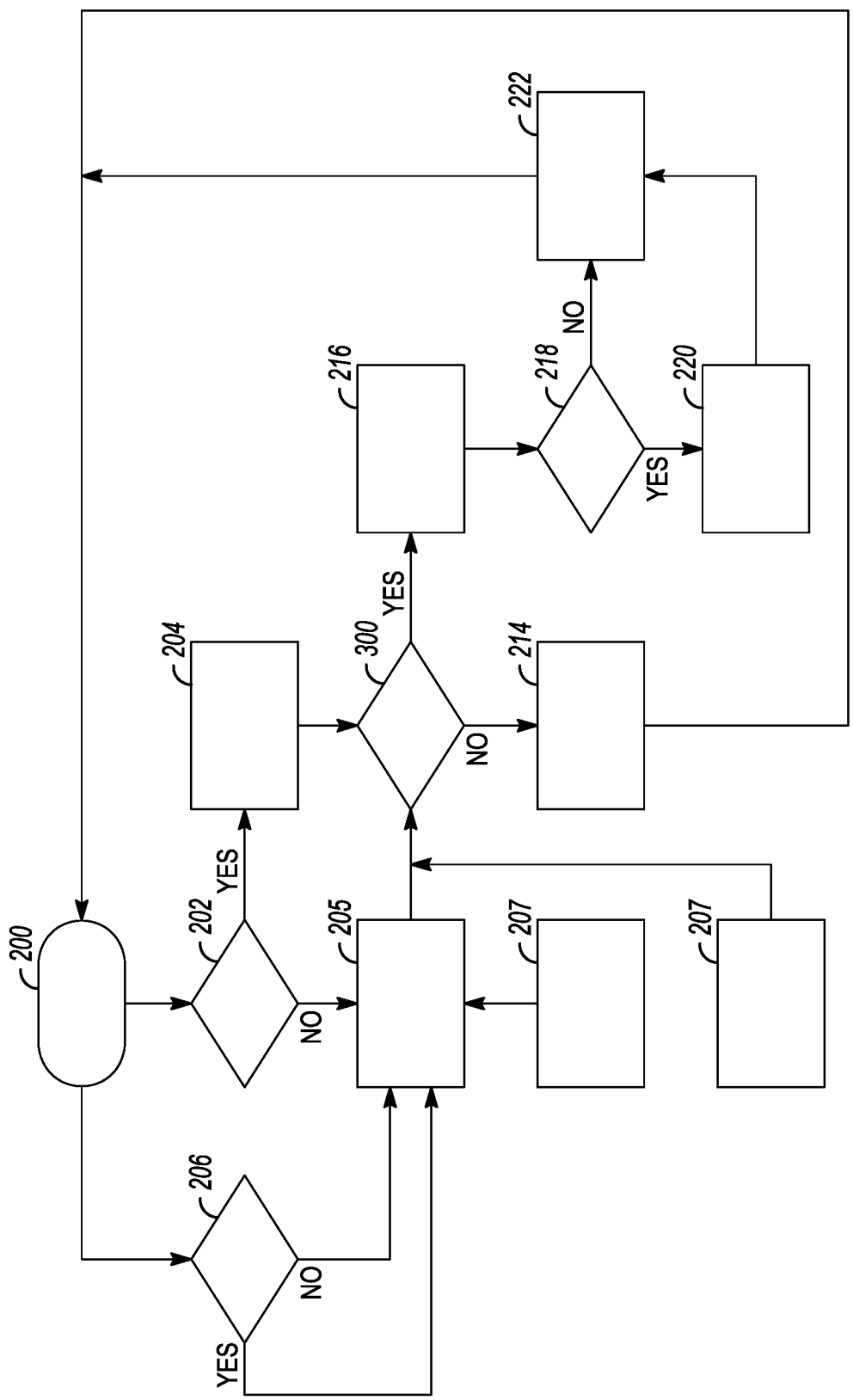
FIG. 2 is a schematic diagram of a decision flow chart of the system and method, according to one alternative.

Referring now to FIG. 2, there is depicted a flow diagram of the method of the system herein. The method commences at startup of the vehicle. From start 200, the system determines if the throttle is engaged or not (or if the throttle or accelerator pedal 202 is depressed), if yes, the vehicle speed limit value is set to the maximum allowable vehicle speed limit value 204. The maximum allowable vehicle speed limit value 204 is determined by the OEM or the work site limitations or regulatory speed limitations. The vehicle operator engages the gear of the vehicle and engages the throttle to move the vehicle to a certain speed no greater than the maximum allowable vehicle speed limit value 204. The instance the throttle is disengaged, in other words, the throttle is not depressed or engaged, the system records the current vehicle speed at the instance of throttle disengagement and sets a vehicle speed limit value 205 as the recorded current vehicle speed at the time of throttle disengagement. Concurrently, the system determines if the brake is engaged (or if the brake pedal is depressed) 206. When the brake pedal is engaged, the vehicle speed limit set above, as 205, is not yet changed. When the brake pedal is released, or disengaged, the system records the current vehicle speed value 207 at the instant the brake pedal is released or disengaged and sets it as the new current vehicle speed limit value 205. The system measures and records the new vehicle speed value instantaneous and up to 50 milliseconds from the action (i.e. brake engaged or not, throttle engaged or not). In a preferred alternative, the time period is between 10-500 milliseconds. As soon as the pedal is released, the throttle resets. This concept is known as the "falling edge".

Once the system records the current vehicle speed value and sets it as the new current vehicle speed limit value 205, the system then actively compares the new current speed limit value limit 205 to the current vehicle speed value 207 as long as the accelerator pedal is not depressed (or not engaged). When the accelerator pedal 202 is depressed (or engaged), the system compares at 300 the maximum allowable (or pre-programmed) vehicle speed limit value 204 to current vehicle speed value 207.

When the accelerator pedal 202 is not depressed, the system then determines at 300 if the current vehicle speed value 207 is greater than the current vehicle speed limit value 205.

Upon comparison to 207, if 300 is no, the current vehicle speed value 207 is below or equal to the current vehicle speed limit value 205 and there is no need for retardive braking 222. Given there is no need for retardive braking, the system sends a "0" or zero signal 214 to the retardive device and the system returns to step 200.

If 300 is yes, and the current vehicle speed value 207 is greater than the current vehicle speed limit value 205, the system then calculates, as determined by the PID loop logic in the controller, the required correction value 216 for the retardive braking 222.

The PID loop logic is described above. The brake pedal depression angle is multiplied by a predetermined gain value and the resulting value is sent to the controller as the retardive braking request as a percentage from 0% to 100% retardive breaking request. One example would be if the preset gain value is 3.3 and the brake pedal depression angle is 30% (in other words, the brake pedal is depressed 30% from the starting position of the brake pedal), the retardive braking request would be 99% to the controller and to the motor to increase resistance on the motor allowing the motor to perform the majority of the required deceleration of the vehicle to the safe speed limit and reducing wear and heat to the service brakes of the vehicle, increasing the life of the service brakes and reducing maintenance costs.

Once the required correction value 216 for retardive braking is calculated, the system determines if the gear (or traction mode) is in neutral 218. If yes, the required correction value is multiplied by the neutral gain value which produces a new required correction value 220. The neutral gain value has a range from greater than 0 to less than or equal to 1, preferably from 0.5 to 1 In this example, it is a value of 0.8. If no, meaning the gear is not in neutral, the correction value is determined with no neutral gain multiplier and is applied for the retardive braking 222 as described above. The neutral gain value serves to deter operators from moving to neutral. The system is always active and continues assessing all the sensors and carrying out calculations as needed.

Example 2

The following is an example of a vehicle experiencing various conditions with the speed controller system engaged and disengaged of the present disclosure. A vehicle having the following specifications:

| Specification | Relay |
|---|---|
| Technical Data | |
| Drive | 4WD |
| Max. Speed | Limited to 25 kph |
| Power | Peak: 150 kW    Continuous: 100 kW |
| Torque | 1550 NM Peak Torque    680 Nm continuous Torque |
| Suspension | Suspension designed according to ISO 7096 |
| Steering | ISO 5010 Power Steering |
| Brakes | Regenerative Braking; Parking Brakes; Service Brakes |
| Tyres | Ø824 mm × 295 mm wide AirBOSS Segmented Solid |
| Tyres (Optional) | Pneumatic Tyre 854691 [LT235/85R16] |
| Operating Temperature Range | −40° C. to 50° C. |
| Expected Range (Ideal Conditions) | 40 km expected, TBC at the mine |
| Ramp Range | TBC 1/4 |
| Side Ramp Range | TBC 1/8 |
| Front/Rear Differential | Front 13.933/Rear 13.933 |
| Cab and Seating | |
| Cab | Enclosed |
| ROPS | ISO 3471 |
| FOPS | ISO 3449: Level 2 |
| NVH Level | <76 dBs @ 30 km/h |
| Seating Capacity | 4 |
| Seat Belts | 4 sets |
| Dimensions | |
| Wheelbase | 2960 mm |
| Width | 2260 mm Operating [2056 mm Shipping] |
| Height | 2500 mm |
| Ground Clearance | 350 mm |
| Deck Length | 4865 mm Overall Length [875 mm Rear Box Length] |
| Battery and Charging | |
| Charge Time (Ideal Conditions) | 20 minutes |
| Expected Charge rate | Offboard charging rate: ≤0.5-hour nominal charge time |
| Energy Storage (Battery Module) | Nominal Voltage: 533 VDC Energy: 43 kWh |
| Subpack Nominal Voltage | 88.8 V |
| Capacity (Rated @ C/2) | 86 Ah |
| 24-Volt Battery (2 × 12 V) | MAGNAVOLT SLA12-3 | was taken on a road surface with various grades to test the speed controller. The controller used was Parker IQAN-MC™ master controller. The throttle/accelerator sensor used was Makersan accelerator pedal, MO450_H10_P009. The speed sensor used was TM4 inverter/controller, CO150-HV-A2. The brake sensor used was Parker ADS50 Analog distance sensor, 01710ECD. The FNR sensor used was Cobo OMNIA F-N-R switch, 01-1113-0000. The retardive braking system used was TM4 inverter/controller, CO150-HV-A2.

Figure 9A:
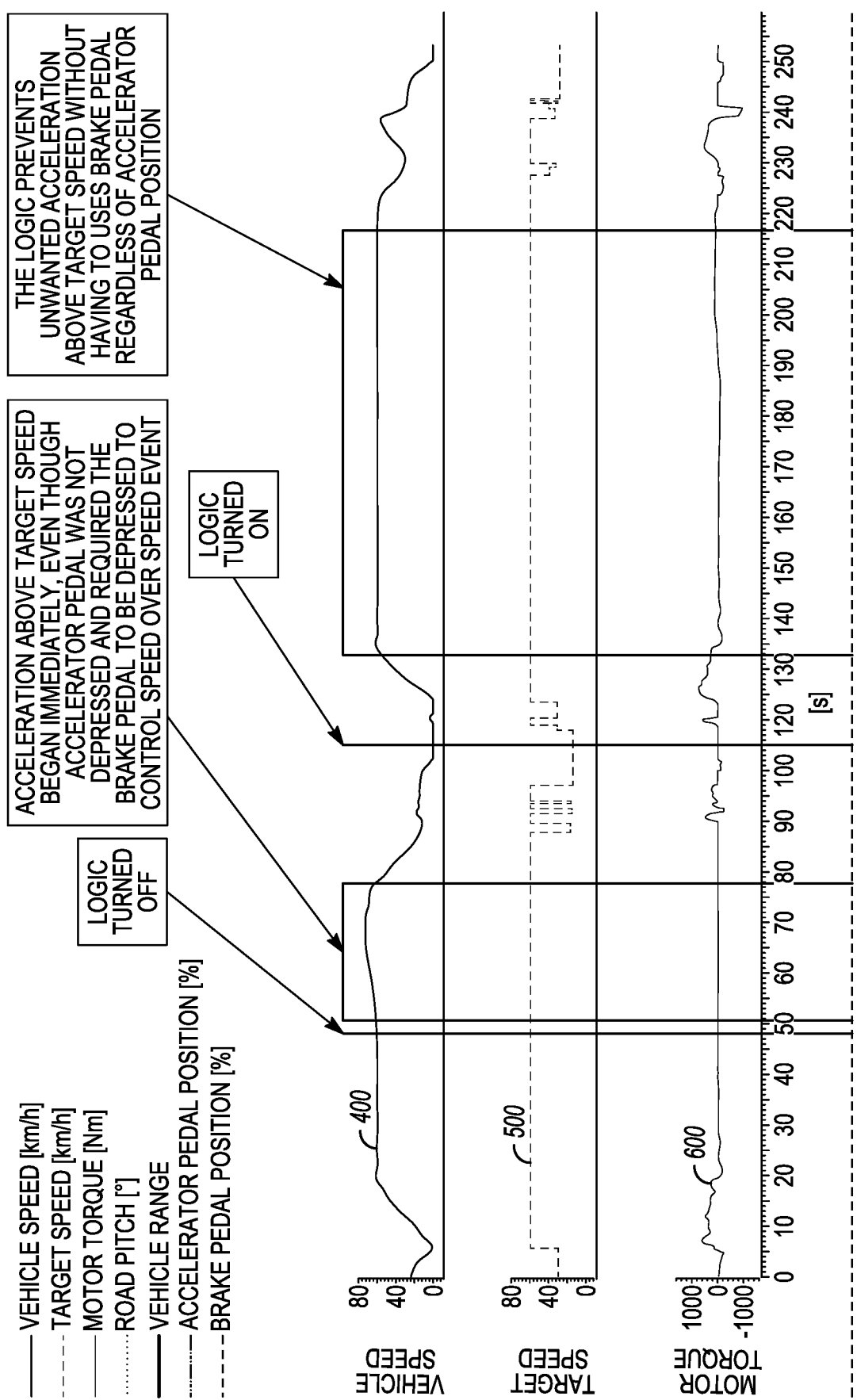
FIG. 9A depicts curves of various sensors of a vehicle with the speed controller when engaged.
Figure 9B:
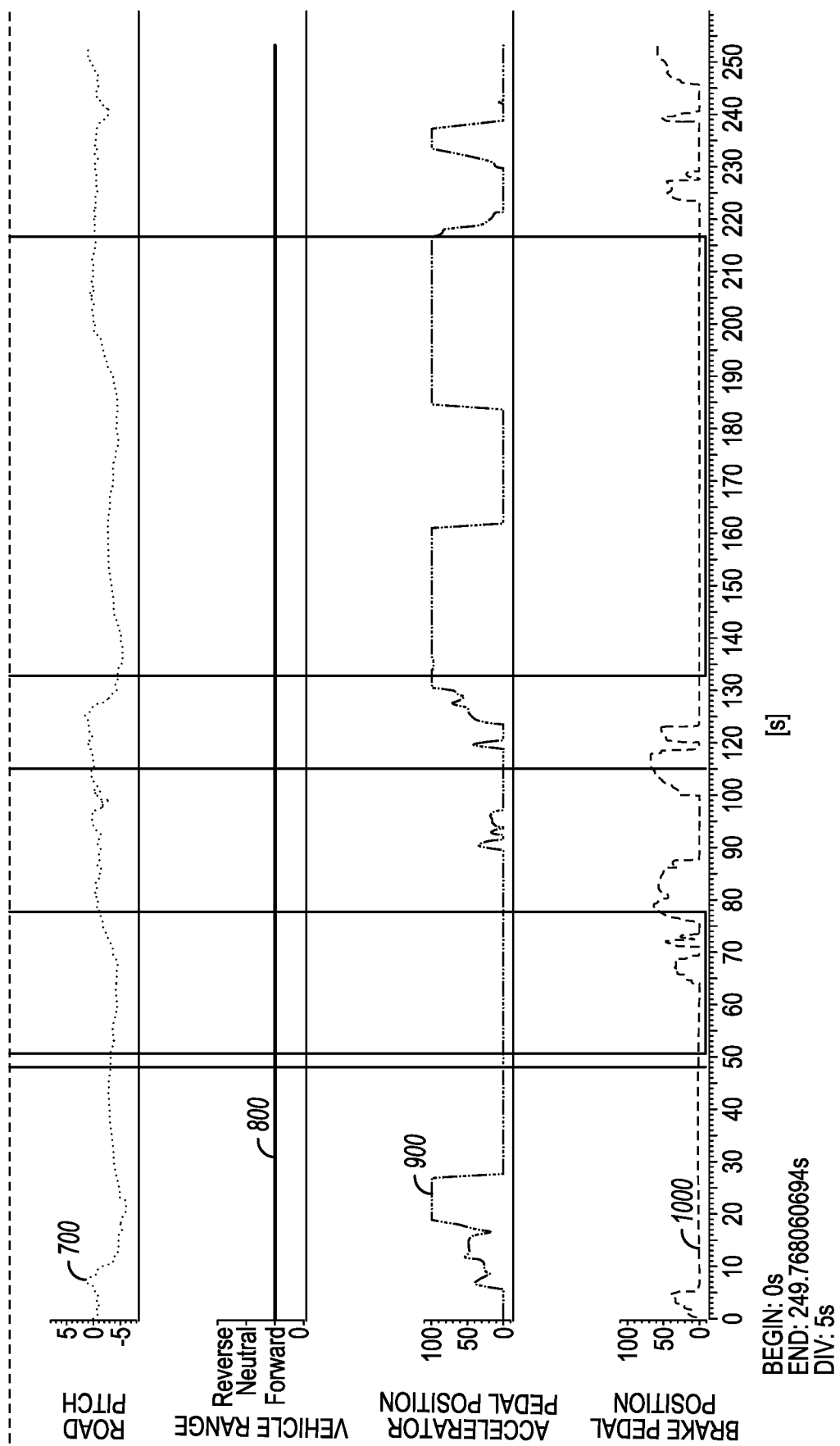
FIG. 9B depicts curves of various sensors of a vehicle with the speed controller disengaged.
Figure 10:
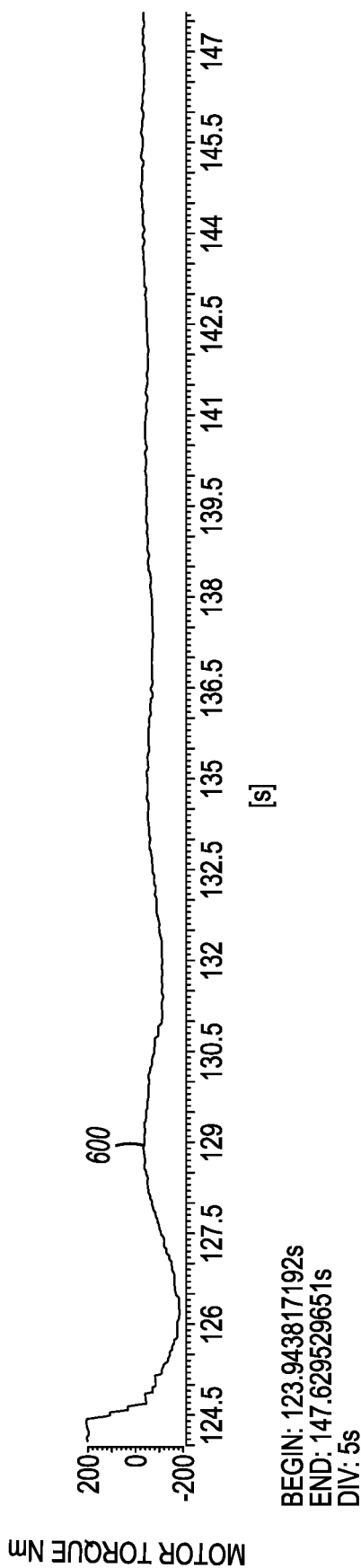
FIG. 10 depicts an exploded view of the motor torque of FIG. 9 while adjusting the retardive braking to maintain the speed of the vehicle at or below the vehicle speed limit value.

As best seen in FIGS. 9A and 9B, there is provided a chart of various parameters over time of a vehicle with a speed controller. The chart provides actual or current vehicle speed value 400, vehicle speed limit value 500, motor torque value 600, road pitch value 700, vehicle gear position 800, accelerator (throttle) pedal position 900 and brake pedal position 1000. From t=5 to t=48 seconds, the speed controller is engaged and the vehicle accelerates to 60 kilometers per hour (kph) and remains at or below the vehicle speed limit value 500 of 60 kph. At t=48 seconds, the vehicle operator disengaged the speed controller and the current vehicle speed value 400 accelerated immediately above the vehicle speed limit value 500 although the accelerator was not engaged (see accelerator pedal position 900 at t=51 to t=75 secs. The brake pedal was required to be engaged to avoid an overspeed situation (see brake pedal position 1000 at t=64 to t=87 secs). At each instance of brake pedal release and/or throttle pedal release (see t=86 to t=97 secs) the vehicle speed limit value 500 was adjusted as per the method described herein. At around t=105 secs, the speed controller system was engaged and the throttle was engaged bring the actual vehicle speed value to 60 kph which is at the vehicle speed limit value 500 of 60 kph. Although the throttle was engaged, the actual vehicle speed value went slightly passed 60 kph but the speed controller prevented unwanted acceleration and over speed regardless if the throttle is engaged or not (see t=123 to t=207 secs) and without having to apply the brakes of the vehicle. The smoothness of the speed controller system may be seen at FIG. 10 which provides an exploded view of the time interval of t=123 secs to t=138 secs of FIG. 9, the motor torque value 600 applied by the retardive braking system of the speed controller. As may be seen in FIG. 10, the smoothness of the fluctuation of the curve of the motor torque value 600 between t=123 secs to t=138 secs allows for the smooth operation of the vehicle maintaining the vehicle speed limit value 500 without vehicle operator discomfort.

Figure 11A:
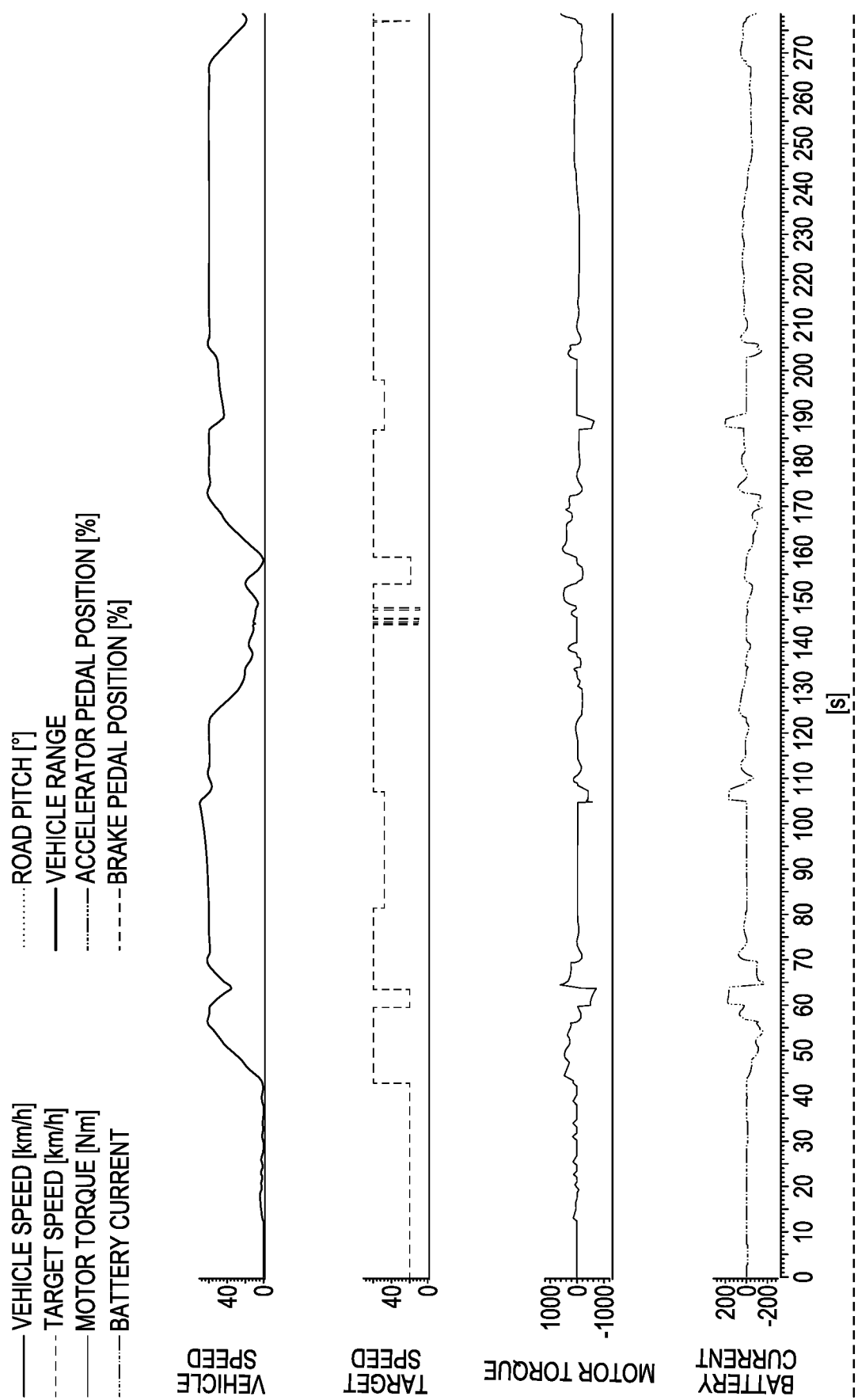
FIG. 11A depicts curves of various sensors of a vehicle with the speed controller when engaged, with the vehicle gear in neutral.
Figure 11B:
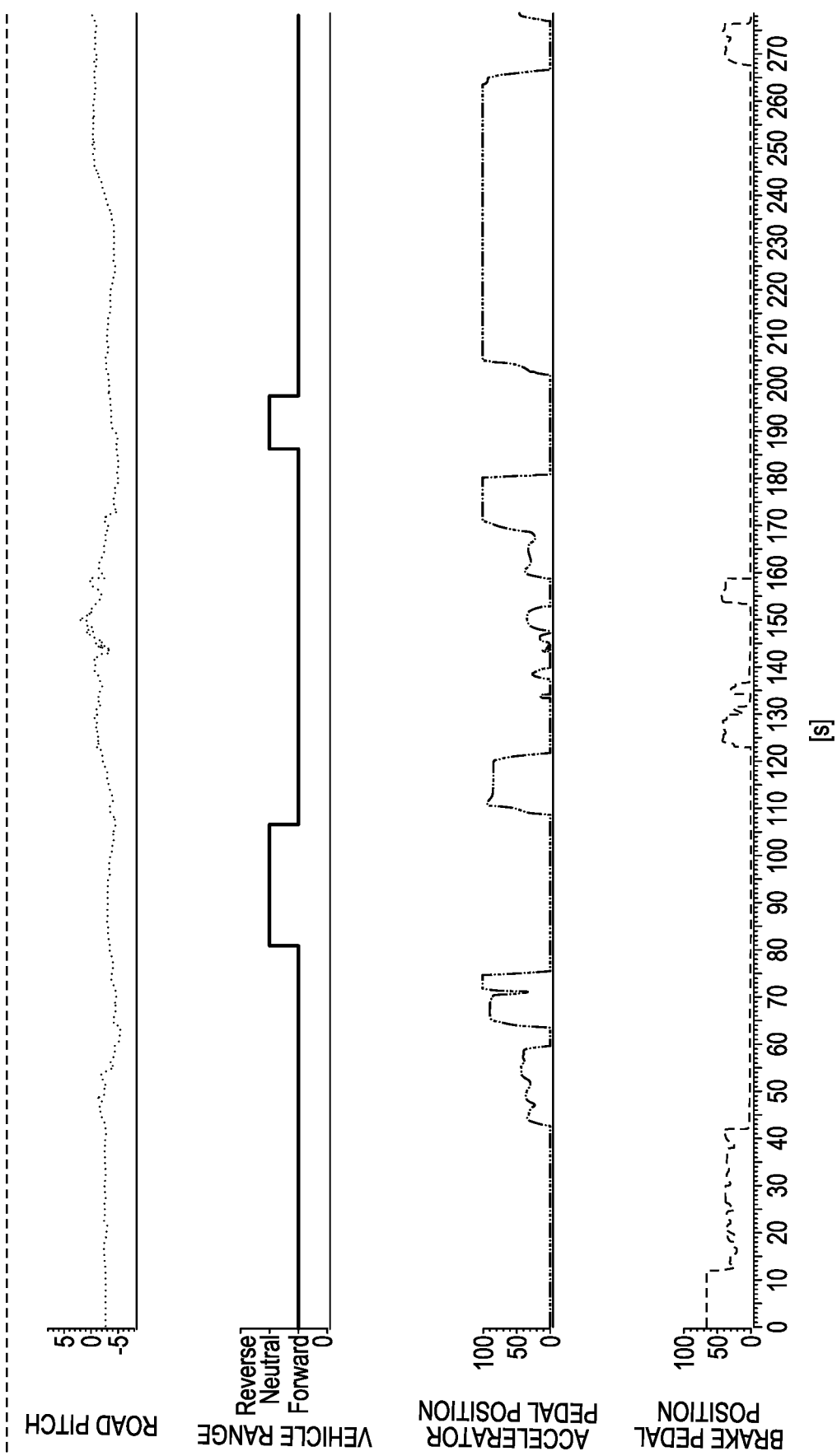
FIG. 11B depicts curves of various sensors of a vehicle with the speed controller when disengaged, with the vehicle gear in neutral.

As best seen in FIGS. 11A and 11B, the vehicle undergoes the same test as above but now the gear is placed in neutral during a period of time of the test. At t=80 secs, the speed controller was turned off (disabled) and the vehicle gear was placed in neutral (at t=81 secs). The vehicle speed increased from 60 kph to 70 kph (above the vehicle speed limit value of 60 kph). At t=104 secs, the speed controller was turned on (enabled) and the vehicle gear was set to forward at t=106 secs. The speed controller applied a torque on the motor via the retardive braking system bringing the actual vehicle speed value to 60 kph by t=107 secs. With the speed controller engaged, the vehicle gear was placed in neutral at t=186 secs. The vehicle speed slowed but then increased due to a grade in the road surface but remained below the vehicle speed limit value 500 in neutral gear due to the speed controller system. The vehicle gear was moved to forward at t=197s.

Figure 3:
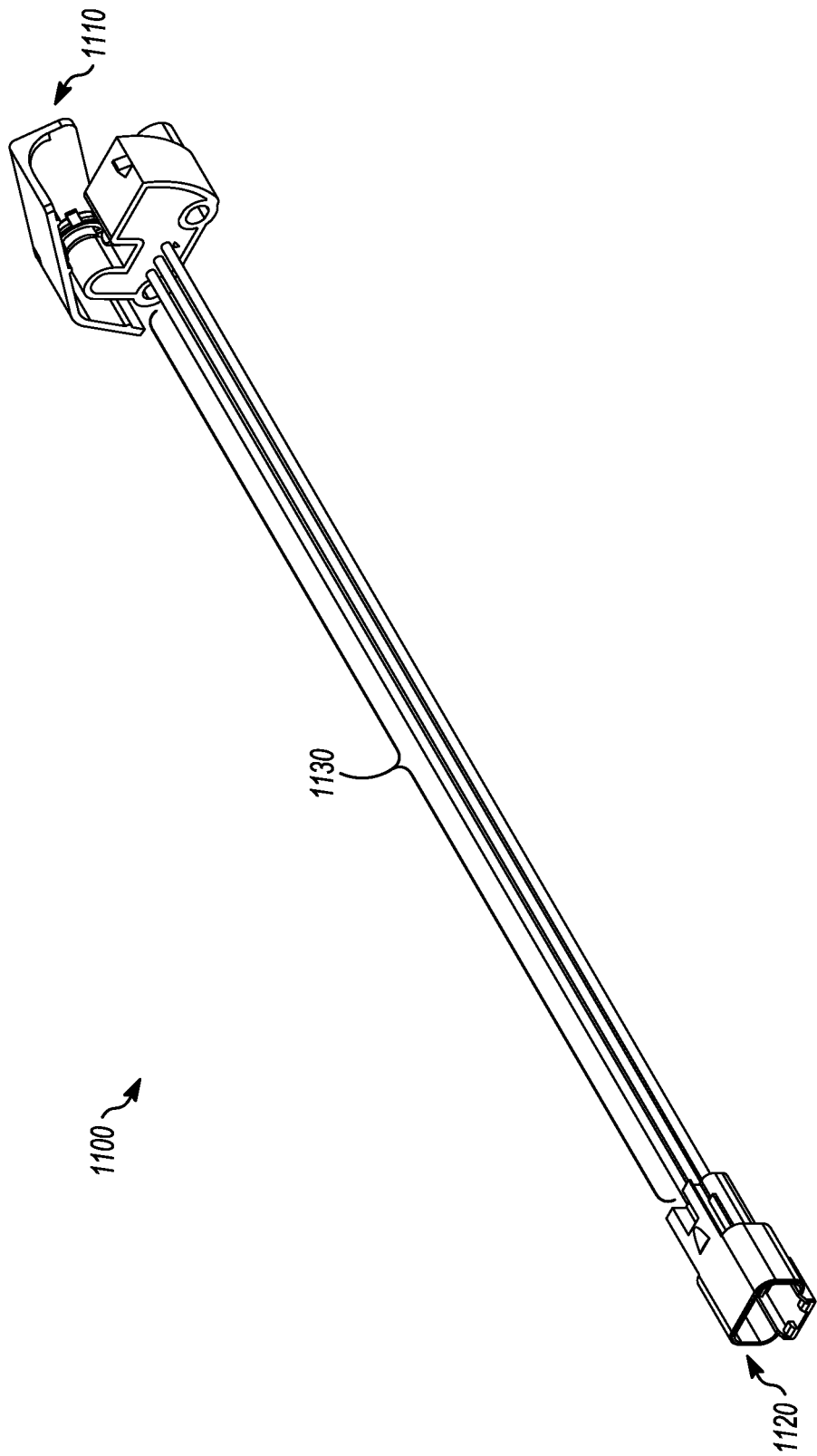
FIG. 3 depicts an analog sensor, for a brake sensor and/or an accelerator sensor, according to one alternative.

Referring now to FIG. 3, there is depicted a analog sensor 1100 for a brake and/or a throttle sensor. A lever 1110 at one end thereof may be attached to a brake and/or throttle pedal to determine the position of the brake and/or throttle pedal when disengaged (position is 0% and 0 inches travel of the lever) to fully engaged (position is 100% and 1 inch travel of the lever). The other end 1120 of the analog sensor 1100 is connected to a controller. The value from 0 to 100% in the form of a voltage signal (0.5 V for 0% and 4.5 V for 100%) is sent to the controller by the communication line 1130.

Figure 4:
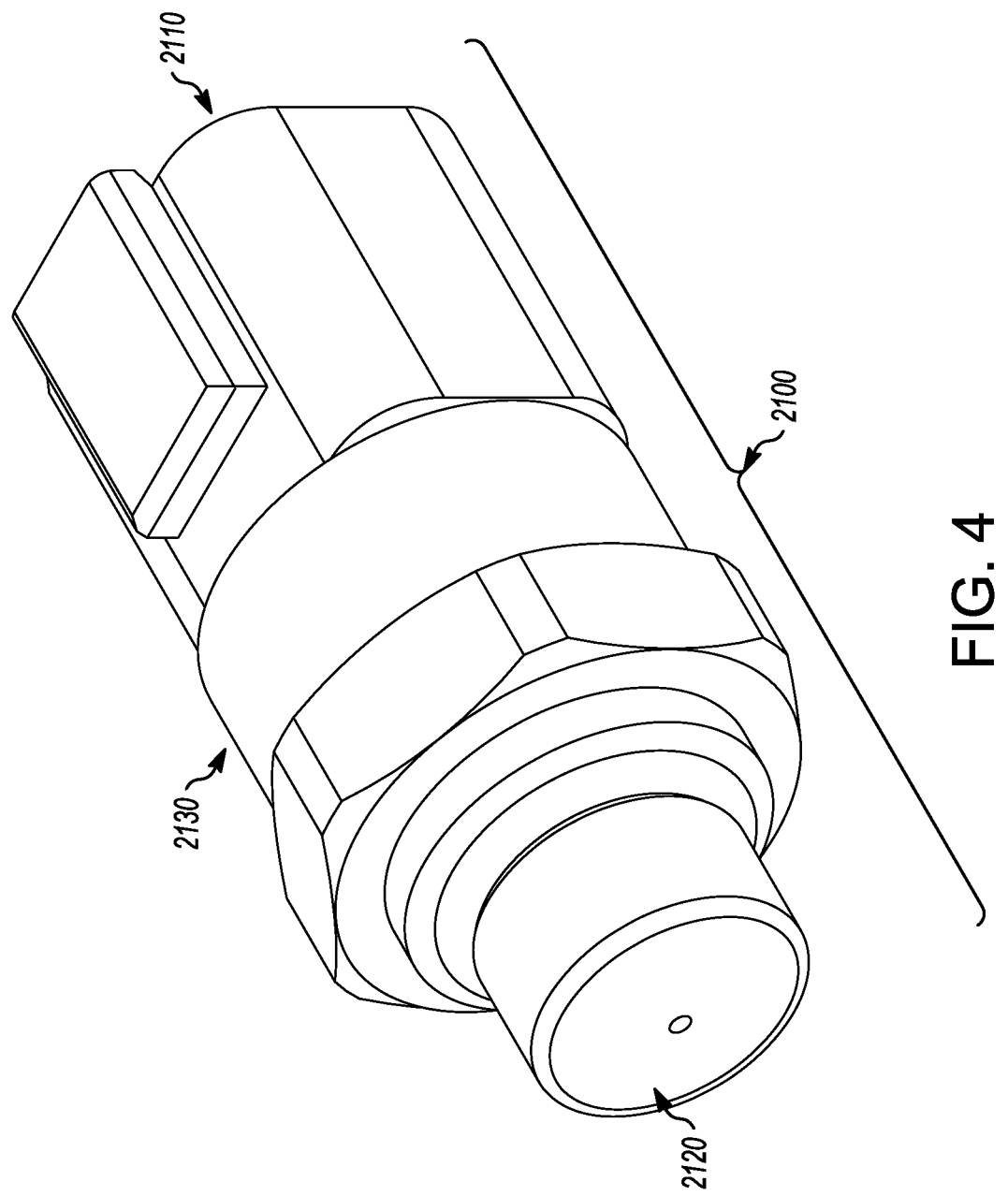
FIG. 4 depicts a pressure sensor, for a brake sensor, according to one alternative.

Referring now to FIG. 4, there is depicted a pressure sensor 2100 for a brake and/throttle pressure pad sensor. End 2120 is in communication with a pressure pad to determine the pressure applied to the pad when disengaged (0% or no pressure) to fully engaged (100% or maximum pressure). The other end 2110 of the pressure sensor 2100 is connected to a controller. The value from 0 to 100% in the form of a voltage signal (0.5 V for 0% and 4.5 V for 100%) is sent to the controller by a communication line 2130.

Figure 5:
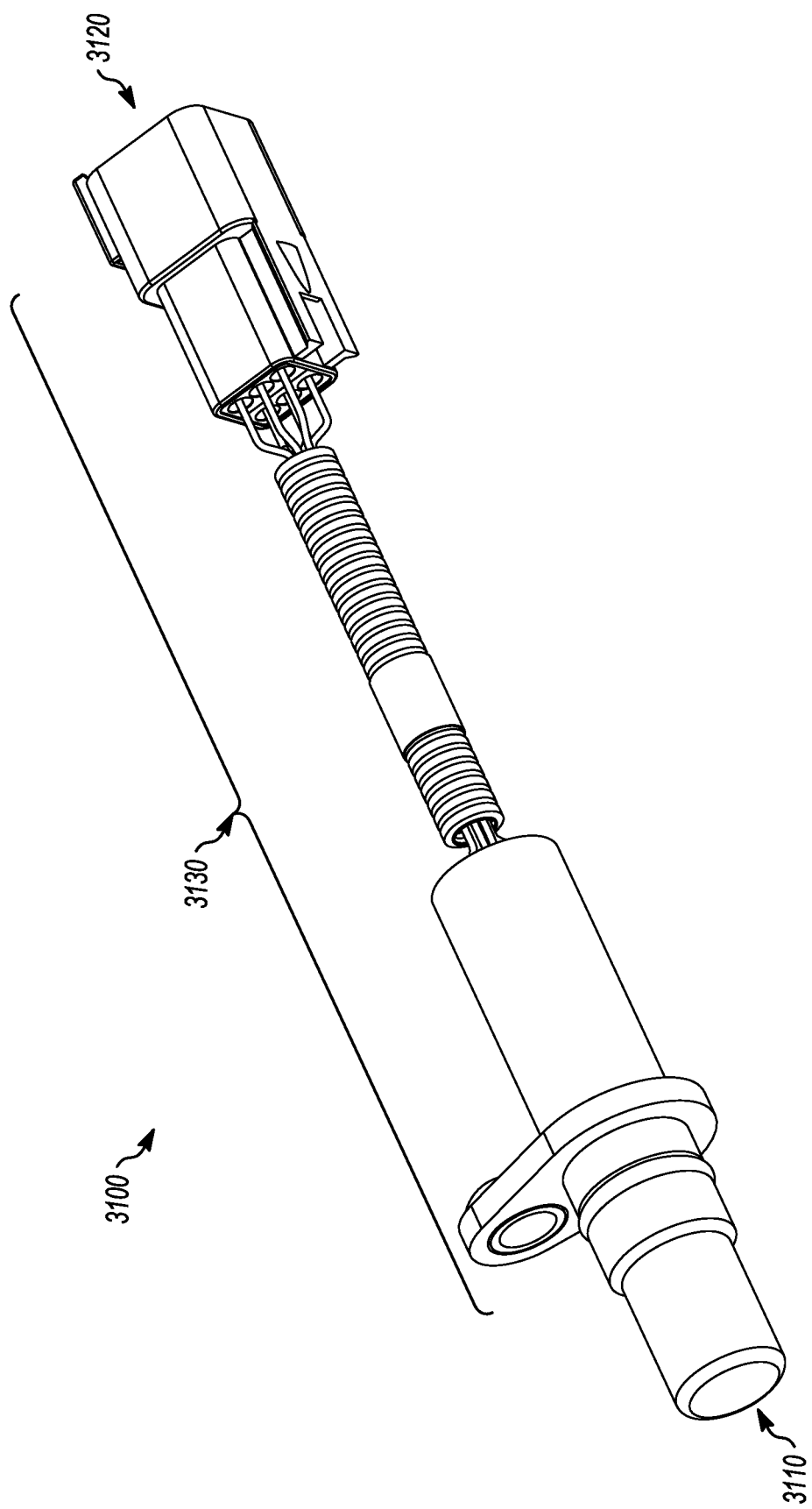
FIG. 5 depicts a ground speed sensor, according to one alternative.

Referring now to FIG. 5, there is depicted a ground speed sensor 3100. The first end, 3110 measures by the Hall effect and with no contact, the rotations per minute of a magnet on a gear or a wheel or a motor of the vehicle. The other end, 3120 is in communication 3130 with a controller and sends a digital signal to the controller of the rotations per minute wherein the controller converts the RPMs to speed of the vehicle.

Figure 6:
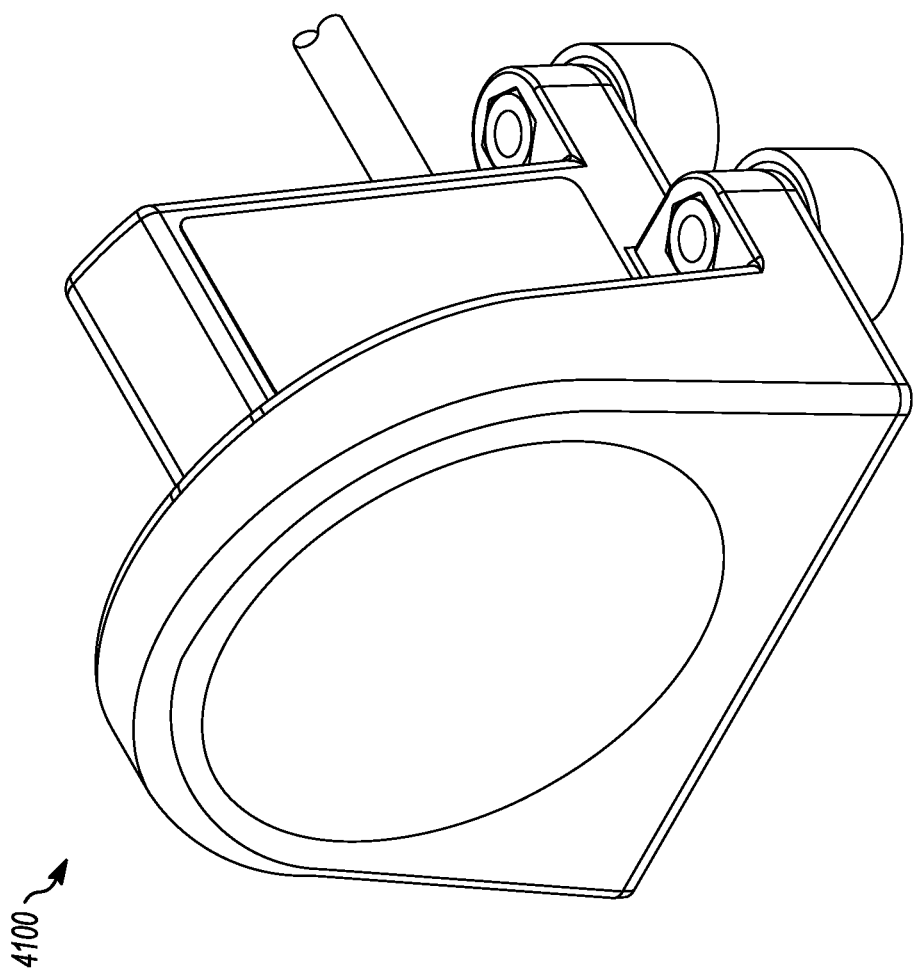
FIG. 6 depicts a true ground speed sensor, according to one alternative.

Referring now to FIG. 6, there is depicted a true ground speed sensor (TGSS) 4100. The TGSS sensor 4100 incorporates the Doppler shift to measure the true ground speed of the vehicle. The TGSS sensor 4100 may be positioned to transmit a signal to the road surface and the signal is reflected off the road surface and the reflected signal is received by the TGSS 4100. When the road surface is moving relative to the TGSS 4100, a change in the reflected signal (Doppler shift) frequency occurs. The true ground speed of the vehicle is calculated by measuring the frequency change.

Figure 7:
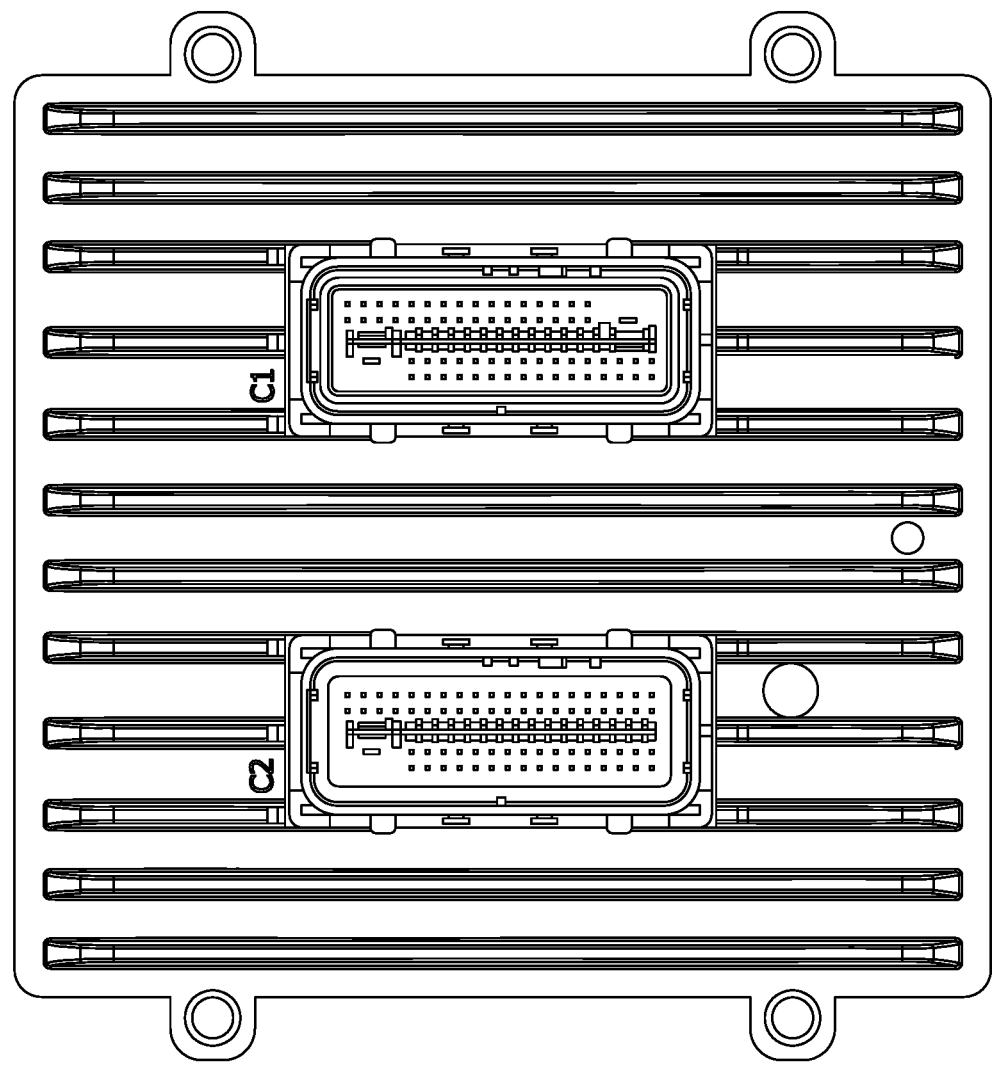
FIG. 7 depicts a controller, according to one alternative.

Referring now to FIG. 7, there is depicted a controller (or computer) 5100 as part of the speed controller system. The controller 5100 is connected to the various sensors described herein and converts the sensor voltage signals to engineering units required to calculate the correction factor, based on the signals received from the various sensor described herein, to send a signal and engage the retardive braking system in order to control the speed of the vehicle such that the vehicle speed is not greater than the vehicle speed limit value. The controller may also calculate the maximum required retardive torque value for deceleration of said vehicle to zero speed, in one alternative, is based on $TB=[rT \times Wv \times (Fd+\sin\theta)]/RG$, where TB=maximum required retardive torque, rT=radius of static loaded tire, Wv=gross vehicle weight, Fd=deceleration factor, θ=maximum angle of decline of the road surface, RG=overall gear ratio between motor and wheel assembly.

Figure 8:
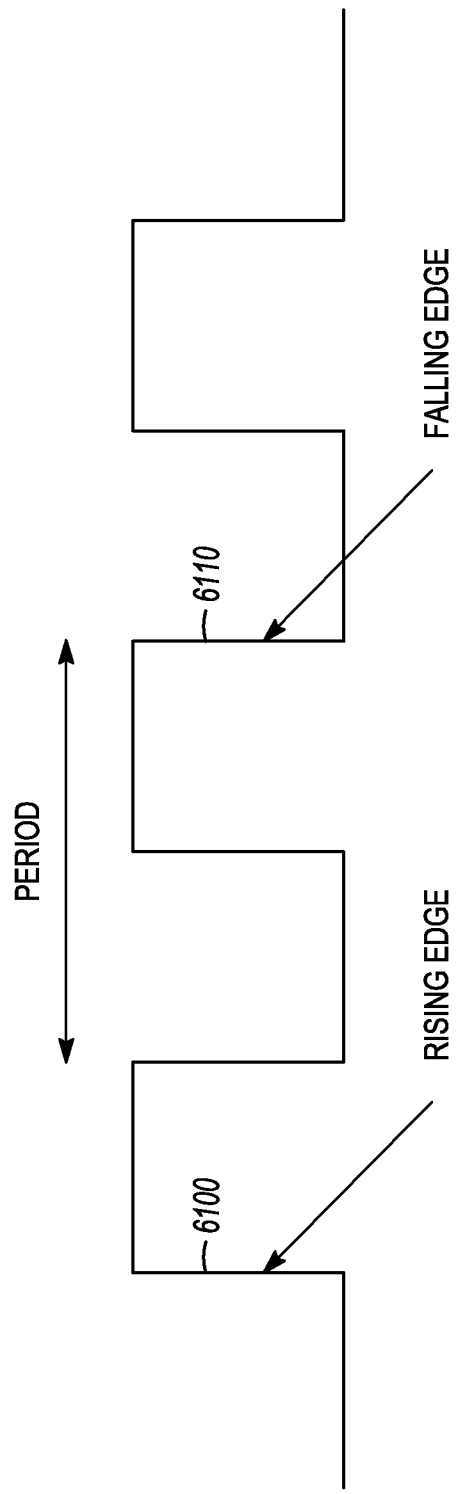
FIG. 8 depicts a falling edge concept.

Referring now to FIG. 8, there is depicted a chart showing a rising edge 6100 and a falling edge 6110. In the present application, the controller records and adjusts the new vehicle speed limit value at the falling edge 6110 at throttle and brake disengagement.

As many changes can be made to the alternatives of the disclosure without departing from the scope thereof; it is intended that all matter contained herein be considered illustrative of the disclosure and not in a limiting sense.

The invention claimed is:

1. A vehicle speed controlling system controlling speed of a vehicle, travelling along a road surface, said vehicle speed controlling system being active when said vehicle is on, said vehicle speed controlling system comprising:
   a. at least one controller;
   b. at least i) one throttle sensor for a non-electric vehicle or ii) one accelerator sensor for an electric vehicle, in communication with said at least one controller;
   c. at least one brake sensor in communication with said at least one controller;
   d. at least one vehicle speed sensor in communication with said at least one controller, wherein said at least one controller further comprises a PID controller; and
   e. at least one retardive braking system in communication with said at least one controller, wherein said at least one controller receives signals from said at least i) one throttle sensor for said non-electric vehicle or ii) one accelerator sensor for said electric vehicle, said at least one vehicle speed sensor and said at least one brake sensor and sends a signal to said at least one retardive braking system controlling speed of said vehicle based on factors including:
      i) maximum allowable vehicle speed limit value;
      ii) gross vehicle weight (Wv);
      iii) maximum angle of decline of said road surface θ;
      iv) radius of a static loaded tire of said vehicle (IT);

v) deceleration factor (Fd), a value of how aggressively the vehicle speed should decrease; and vi) one of: overall gear ratio between a motor of said vehicle and a wheel assembly of said vehicle (RG) for said electric vehicle, or overall gear ratio between a retarder and drive wheels linked to a tractive device for said non-electric vehicle;

wherein a maximum retardive torque is defined as TB=[rT×Wv×(Fd+sinθ)]/RG.

2. The vehicle speed controlling system of claim 1, further comprising at least one gear sensor in communication with said at least one controller.

3. The vehicle speed controlling system of claim 1, wherein said at least one throttle sensor is a throttle pedal position sensor.

4. The vehicle speed controlling system of claim 1 wherein said at least one accelerator sensor is a accelerator pedal position sensor.

5. The vehicle speed controlling system of claim 4, wherein said at least one brake sensor is selected from the group consisting of a brake pedal position sensor and a brake pad pressure.

6. The vehicle speed controlling system of claim 1, further comprises at least one gear sensor in communication with said at least one controller wherein said at least one gear sensor is a gear position sensor.

7. The vehicle speed controlling system of claim 1, further comprises at least one gear sensor in communication with said at least one controller wherein said at least one gear sensor is a neutral gear position sensor.

8. The vehicle speed controlling system of claim 1, further comprising at least one direction range sensor.

9. The vehicle speed controlling system of claim 1, wherein said vehicle is an electric vehicle, further comprising at least one direction range sensor wherein said at least one direction range sensor is a forward, neutral and reverse (FNR) position sensor for said electric vehicle.

10. The vehicle speed controlling system of claim 1, further comprising at least one motor in communication with said at least one controller.

11. The vehicle speed controlling system of claim 1, further comprising at least one energy source for said at least one controller and said motor.

* * * * *